Dec. 8, 1925.  
E. L. H. BAUERMEISTER  
1,564,508  
BLAST SIFTER  
Filed May 12, 1924
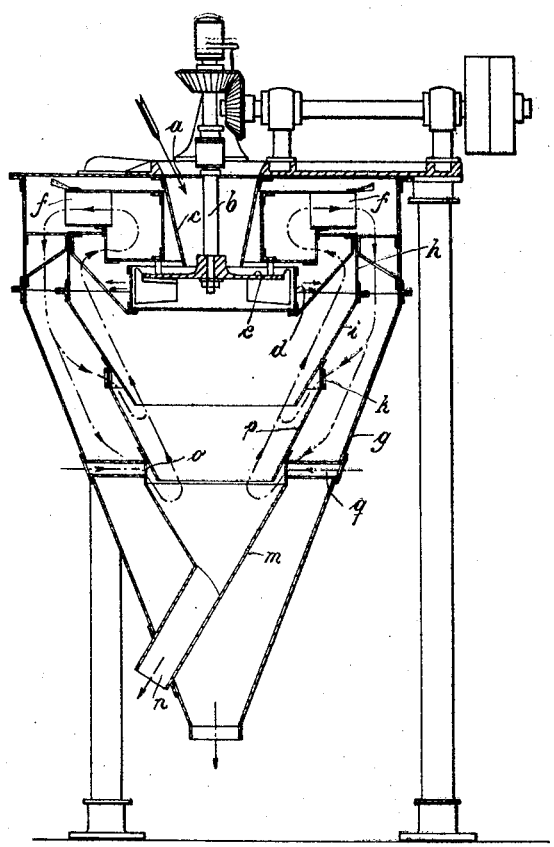
Inventor  
Emil Ludwig Hermann Bauermeister.  
by Langner, Parry, Card & Langner  
Att'ys.

Patented Dec. 8, 1925.

1,564,508

UNITED STATES PATENT OFFICE.

EMIL LUDWIG HERMANN BAUERMEISTER, OF ALTONA-OTTENSEN, GERMANY.

BLAST SIFTER.

Application filed May 12, 1924. Serial No. 712,837.

*To all whom it may concern:*

Be it known that I, EMIL LUDWIG HERMANN BAUERMEISTER, citizen of Germany, residing at Altona-Ottensen, Friedensallee 44, Germany, have invented certain new and useful Improvements in Blast Sifters, of which the following is a specification.

According to U. S. Patent 1,058,344, a method and a blast sifter for sifting grinding products particularly cocoa powder are disclosed in which it is essential, that the material being sifted be pressed through screens into the sifting receptacle and that the said pressed mixture of more or less fine powder be taken along with a regenerating stream of air. It thereby results, that a constant circulating stream of air is used repeatedly within the blast sifter and will finally be heated to such an extent that in sifting cocoa the melting point of the butter contained in the cocoa will be attained, owing to which the clogging of the cocoa powder sets in and the sifting effect is diminished. Therefore the inclosing mantle of the blast sifter as formerly used was omitted, and only fresh air entering from outside the device was utilized. This resulted in reducing the efficiency of the apparatus. Also the fineness of the powdery products was limited to a certain extent.

The object of the present invention is to produce an even fine cocoa powder without reducing the efficiency of the apparatus. Of cocoa it has been frequently said, that it is not sufficiently digestible. By elaborate trials the applicant has found that the indigestibility of cocoa is due to the lack of fineness of the cocoa powder. By the use of the device of the present invention it is possible to sift cocoa powder to such an evenness that a cocoa of very great fineness is secured and thereby the yield is correspondingly increased.

The problem is solved by taking care to subject the sifting material for a sufficient length of time to the action of the blast sifter so as to secure with financial advantage an exceedingly fine powdery product, for example, easily digestible cocoa powder. For this purpose an inclosing mantle is used which allows a repeated circulation of the stream of air impregnated with the sifting material, while for nevertheless avoiding an undesired increase of temperature constant cold air is fed by special pipes which reach from outside the apparatus into the sifting space. The constant feeding of fresh air permits the stream of air to circulate with greater speed without danger of the temperature increasing up to the melting point of the cocoa butter. The desired effect can be further increased by adding to the blast sifter a special structure projecting downwardly which structure consists of a second truncated cone diverging upwardly and provided at its bottom in the same manner with a perforated feeding ring as the feeding ring of the upper well-known truncated cone. By this duplication of perforated feeding rings a double sifting of the material is obtained. By this means also a stronger stream of air and more exact separation of the finest powder from the coarse is secured. The air pipes preferably are led up to the last named ring, the cross section of the openings of which is made adjustable in the same way as that of the upper ring.

By the above described blast sifter it is possible to introduce fresh air in spite of the uninterrupted circulation of the air, and to increase the space within the apparatus thus also impeding the increase of temperature.

In the drawing is shown a blast sifter in vertical section embodying the invention.

The powdery ground material, which is to be sifted, is fed in a known manner through an opening *a* in the top of the sifter and by a cylindrical or conical mantle *c* surrounding the vertical shaft *b* to the spreading disk *e*, mounted below on the shaft *b*; the spreading disk being rotated at a high velocity throws the material against the surrounding screen *d*. The exhauster vanes *f* connected with the disk *e* and thus also quickly rotated have a sucking action on the outer surface of the screen *d* and thus cause the circulation of the air within the surrounding mantle or funnel *g*. The space intermediate of the screen *d* and the opposite cylinder *h* together with the truncated cone *i* connected therewith forms the sifting space proper. The air enters the truncated cone *i* from below, coming from the ring *k* constructed as a hit-and-miss gate. In the stream of air moving upwardly in this space a separation takes place of the fine dust particles contained in the material passing through the screen $d$, which particles are taken along with the air. Thus far described the construction corresponds to that described in the U. S. Patent No. 1,058,344. In the new blast sifter, like in the older sifters, a special surrounding mantle $g$ is provided, so that a circulation of air can be produced within this mantle in that from the sifting space the air impregnated with the dust particles is driven by the exhauster vanes $f$ into the top of the space between the sifter proper and the mantle $g$. The coarse parts of the material fall downwardly within the sifting space and will be guided by the funnel $m$ to the outlet pipe $n$. Moreover in the new sifter between the collecting funnel $m$ and the sifter funnel $i$ is a second blast sifting cone $p$ is interposed, which on the top is connected with the ring $k$ and with its lower end projects into the collecting funnel $m$ to a slight extent, and is here connected with a second perforated ring $o$ also constructed as a hit-and-miss gate. Through the space surrounded by the mantle $g$ fresh air feeding pipes $q$ project in the construction shown, up to the perforated ring $o$, so that fresh air may enter the sifting mantle $p$ from below. The air introduced by the action of the exhauster vanes $f$ and impregnated with dust particles, is sucked in through the ring $o$ and on its way between the lower ends of the two truncated cones $i$ and $p$ experiences a second sifting. This permits regulation of the air by the aid of the hit-and-miss gate $k$, so that it enters at such a velocity, that all heavier particles can fall down and allow the lighter particles as far as they are in a downward motion to pass while the new air entering through the hit-and-miss gate $o$ causes a second sifting on a comparatively large path forcing the lighter particles, which not yet are moving downwardly, to return while the heavier particles can fall downwardly unimpeded. The double sifting thus obtained effects an accurate separation of the finer particles from the sifting material. By regulating the hit-and-miss gates $k$ and $o$ any desired degree of separation can be secured.

This regulatability is not only of great value for cocoa powder but also for other materials to be sifted, for instance particularly for sifting banana flour which, as is well known, is still more difficult to be sifted than cocoa powder, but also for powdery materials of other industries the blast sifter can advantageously be made use of to a large extent.

Instead of introducing fresh air to the lower sifting mantle $i$, as in the drawing, fresh air can be introduced from below by the aid of pipes $q$, which project from outside up to the hit-and-miss gates. In any case heating to a too great extent is prevented thereby.

I claim:

1. A blast sifter for separating ground material comprising a plurality of truncated conical sifting receptacles positioned one above the other a perforated ring formed as a hit-and-miss gate intermediate consecutive conical receptacles, a screen within the sifting receptacles, a rotatable spreading disk within the screen, a mantle inclosing the sifting receptacles, revolving exhauster blades within the mantle for causing circulation of air impregnated with shifting material fed to the spreading disk and driven through the screen, and pipes connecting the sifting receptacle with the atmosphere to regenerate the air within the apparatus, the pipes being attached to the inclosing mantle and reaching up to the lower end of a hit-and-miss gate.

2. A blast sifter for separating ground material, comprising, a plurality of truncated conical sifting receptacles positioned one above the other, at least two perforated rings each formed as a hit-and-miss gate positioned intermediate consecutive conical receptacles, a screen within the sifting receptacles, a rotatable spreading disk within the screen, a mantle inclosing the sifting receptacles, revolving exhauster blades within the mantle for causing circulation of air impregnated with sifting material fed to the spreading disk and driven through the screen, and pipes connecting the sifting receptacles with the atmosphere to regenerate the air within the apparatus.

In testimony whereof I have signed my name to this specification.

EMIL LUDWIG HERMANN BAUERMEISTER.